(12) United States Patent
Maeng

(10) Patent No.: US 8,863,272 B1
(45) Date of Patent: Oct. 14, 2014

(54) METHODS, DEVICES, AND MEDIUMS ASSOCIATED WITH AUXILIARY DOCUMENT CONTENT

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 215 days.

(21) Appl. No.: 13/008,857

(22) Filed: Jan. 18, 2011

(51) Int. Cl.
*G06F 7/04* (2006.01)
*G06F 21/31* (2013.01)

(52) U.S. Cl.
CPC ...................................... *G06F 21/31* (2013.01)
USPC .............................. 726/19; 715/230; 715/200

(58) Field of Classification Search
CPC ...................................................... G06F 21/21
See application file for complete search history.

(56) References Cited

U.S. PATENT DOCUMENTS

| | | | | |
|---|---|---|---|---|
| 7,607,176 B2* | 10/2009 | Leone et al. | ..................... | 726/27 |
| 7,949,791 B2* | 5/2011 | Serena | ......................... | 709/246 |
| 2004/0088332 A1* | 5/2004 | Lee et al. | ....................... | 707/200 |
| 2005/0097438 A1* | 5/2005 | Jacobson | ................... | 715/500.1 |
| 2008/0184102 A1* | 7/2008 | Selig | .............................. | 715/234 |
| 2009/0025016 A1* | 1/2009 | Crucs | ............................. | 719/329 |
| 2010/0174799 A1* | 7/2010 | Hewitt et al. | ................. | 709/206 |
| 2011/0258043 A1* | 10/2011 | Ailaney et al. | ............ | 705/14.49 |
| 2012/0036423 A1* | 2/2012 | Haynes et al. | ................ | 715/230 |

* cited by examiner

*Primary Examiner* — Nirav B Patel
*Assistant Examiner* — Mohammed Waliullah
(74) *Attorney, Agent, or Firm* — Stolowitz Ford Cowger LLP

(57) ABSTRACT

A processing device is configured to populate a document template with first content and second content and publish a document with the first content from the document template. The processing device is configured to suppress the second content from the published document.

42 Claims, 8 Drawing Sheets

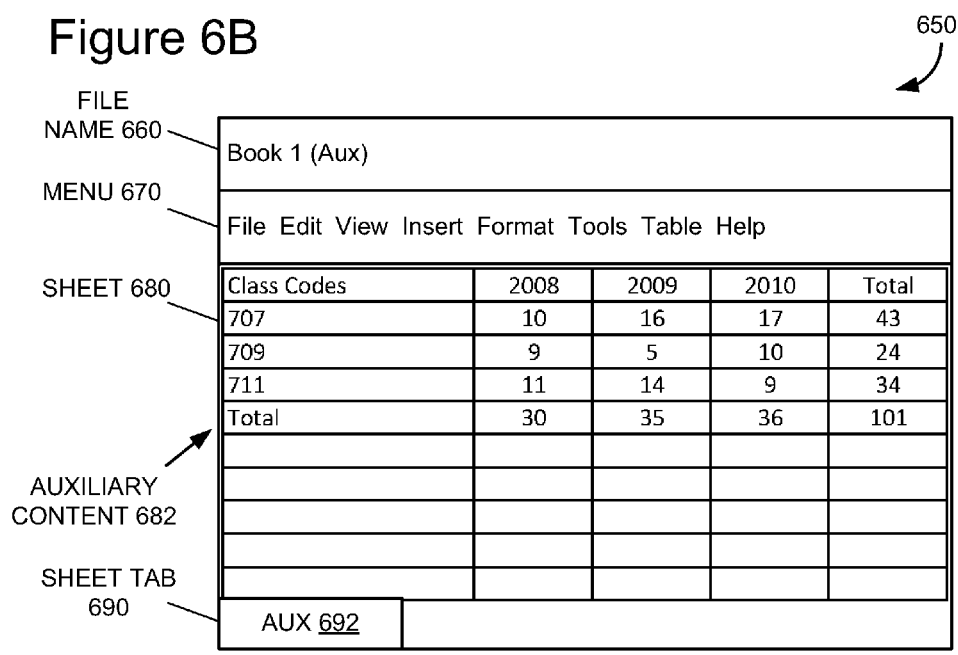

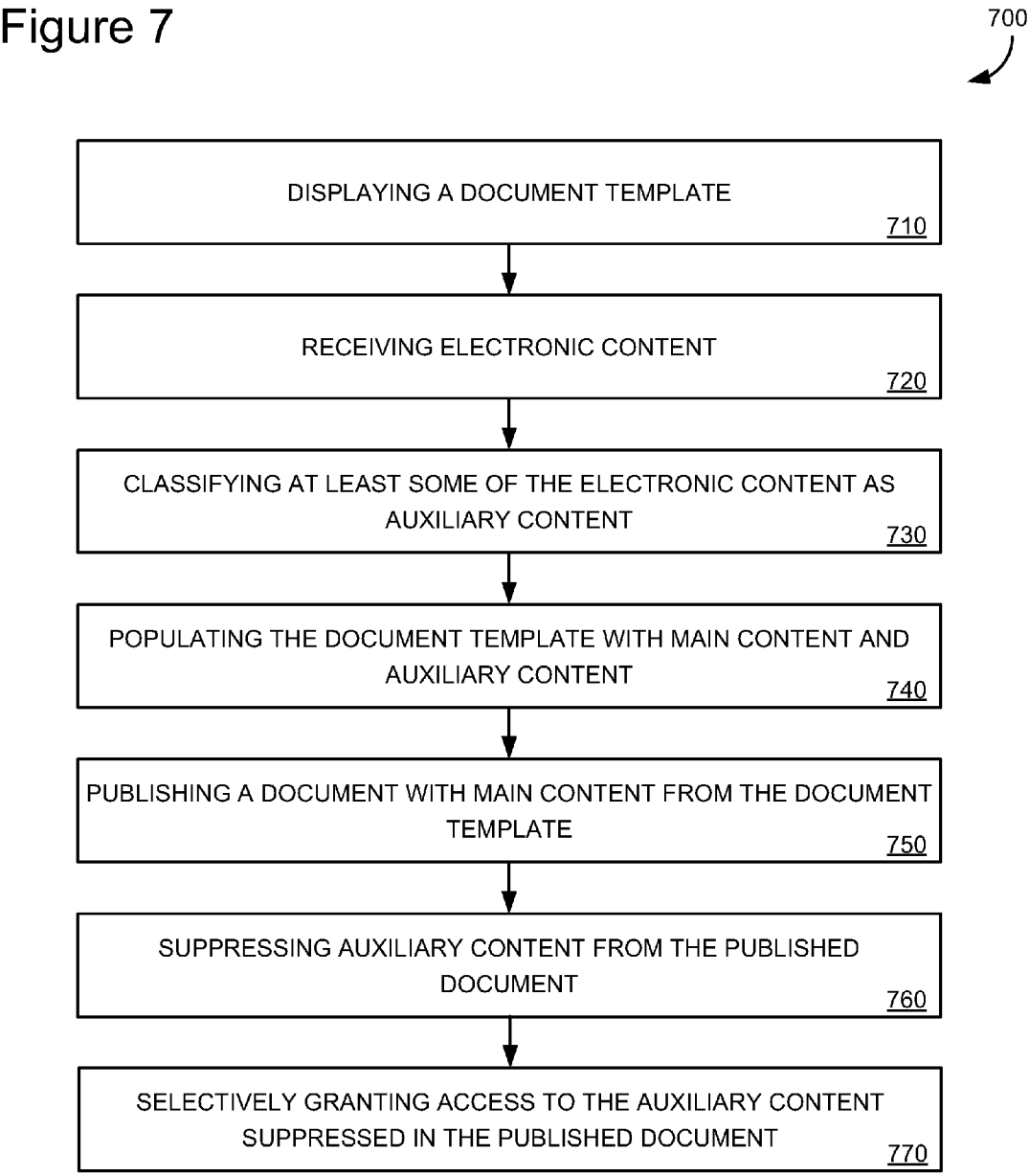

US 8,863,272 B1

METHODS, DEVICES, AND MEDIUMS ASSOCIATED WITH AUXILIARY DOCUMENT CONTENT

BACKGROUND

A known program suite may include an application, such as a word processing application, a worksheet application, or a slide presentation application, that allows a user to produce a document. The application may include a displayable document template, for example, a word processing page, a worksheet, or a presentation slide, which the user may populate with content to produce the document.

The application may allow the user to enter content in the displayable document template and to revise or delete the content to produce a final version of content for the document. The application also may allow the user to enter reference material, such as notes or comments, in the displayable document template. The application may render the reference material available to the user during production of the document, and allow the user to manually remove the reference material from inclusion in the final version of content for the document.

DESCRIPTION OF THE DRAWINGS

FIGS. 6A-6B depict an example of auxiliary content management with a plurality of worksheets.

FIG. 7 depicts a flow chart of an example process for managing auxiliary content in a document template.

DETAILED DESCRIPTION

Figure 1:
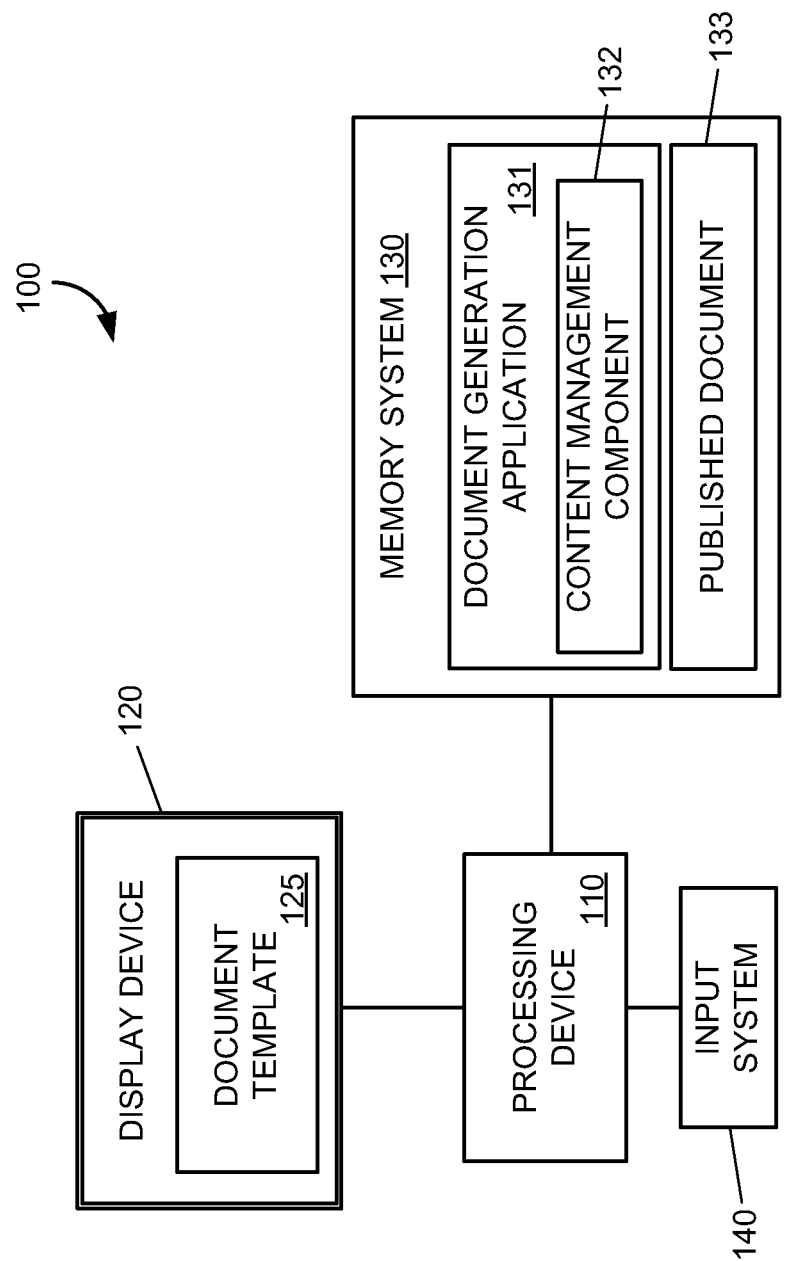
FIG. 1 depicts a block diagram of an exemplary document generation system.

FIG. 1 depicts a block diagram of a document generation system 100. Referring to FIG. 1, document generation system 100 may include a processing device 110 that may be coupled to a display device 120, a memory system 130, and an input system 140. Processing device 110 may execute a document generation application 131, such as a word processing application, a worksheet application, or a slide presentation application, stored in memory system 130. Processing device 110 may prompt display device 120 to present a document template 125 in response to the execution of document generation application 131. In some examples, document template 125 may be a word processing page, a worksheet, a presentation slide, or the like, or any combination thereof. Display device 120 may comprise a monitor, a television, a display system, a touch screen, a projection system, or any other device capable of presenting document template 125, or any combination thereof.

Document generating system 100 may include input system 140 to receive user input associated with document template 125. Input system 140 may receive user input in various formats, such as a textual input, a graphical input, an audio input, a selection input corresponding to document template 125, or the like, or any combination thereof. Input system 140 may receive the user input with at least one user interface device, such as a keyboard, a mouse, a touch screen, a touch pad, a joystick, a signal reception sensor, a microphone, a motion sensing device, or the like, or any combination thereof.

Processing device 110, in response to the execution of document generation application 131, may enter electronic content into document template 125 based on the user input to the input system 140, and may publish at least some of the content in document template 125 into a published document 133. In some examples, processing device 110 may store published document 133 in memory system 133 or may send published document 133 to one or more device external from document generation system 100.

The electronic content entered into document template 125 may include document content, such as text, figures, table, photographs, hyperlinks, multi-media objects, graphical objects, or the like, or any combination thereof. The electronic content entered into document template 125 also may include auxiliary content, such as notes, reminders, draft text, excerpts from books or other resources, links to various information sources, alternative plots, or the like, or any combination thereof, which may serve as resources for the user to reference while generating the document content. In some examples, the auxiliary content may include additional document content, which processing device 110 may selectively include in published document 133 as document content.

Document generation application 131 may include a content management component 132 to manage the auxiliary content in document template 125. For example, content management component 132 may classify at least some of the content entered into document template 125 as auxiliary content based on user input. Content management component 132 may differentiate the auxiliary content from the document content in document template 125, for example, by utilizing different formatting for the auxiliary content or by separating the auxiliary content into a different document template.

Content management component 132 may suppress the auxiliary content from published document 133. In some examples, content management component 132 may suppress the auxiliary content from published document 133 by removing the auxiliary content automatically from document template 125 during publishing. Content management component 132 also may hide the auxiliary content within published document 133, and, in some instances, may secure the hidden auxiliary content from unauthorized access. For example, processing device 110 may receive user authentication information, and content management component 132 may provide access to the hidden auxiliary content in published document 133 in response to the user authentication information, such as a password.

Figure 2:
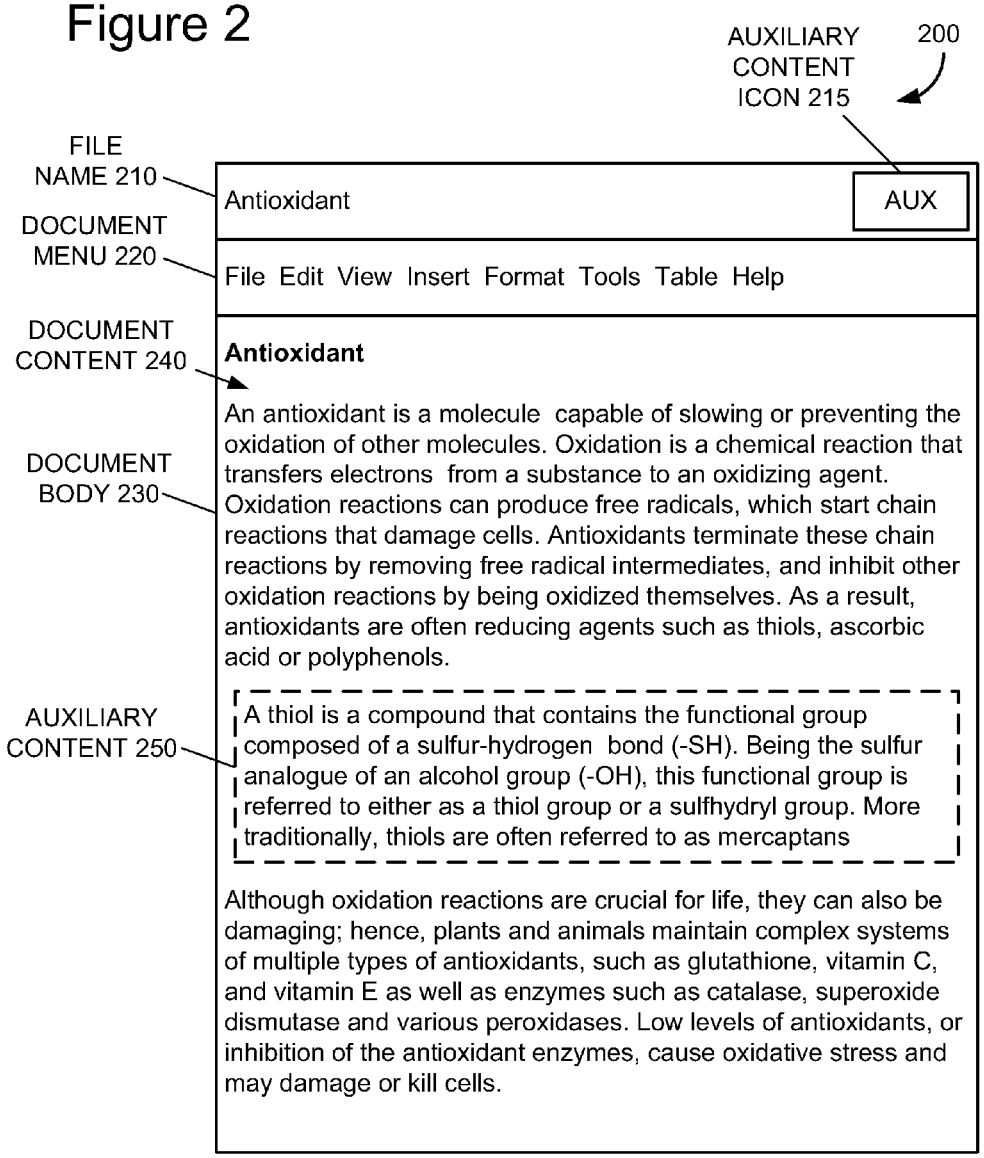
FIG. 2 depicts an example of auxiliary content management with a word processing template.

FIG. 2 depicts an example of auxiliary content management with a word processing template 200. Referring to FIG. 2, word processing template 200 may include a file name 210, an auxiliary content icon 215, a document menu 220, and a document body 230. File name 210 may include a name of a document associated with word processing template 200. Document menu 220 may provide various features for creating, editing, viewing, formatting, and managing content in document body 230.

Document body 230 may include document content 240, such as text, figures, tables, photographs, hyperlinks, multimedia objects, graphical objects, or the like, or any combination thereof. For example, document body 230 may include an article about antioxidants as document content 240. Document body 230 also may include auxiliary content 250, such as notes, reminders, draft text, excerpts from books or other resources, links to various information sources, alternative plots, or the like, or any combination thereof, which may serve as resources for the user to reference while generating document content 240. For example, document body 230 may include an example paragraph about thiol, as auxiliary content 250, which may augment or may be used as reference material for the article about antioxidants.

Word processing template 200 may classify content in document body 230 as auxiliary content 250, for example, in response to an actuation of auxiliary content icon 215. In some examples, content entered into document body 230, while auxiliary content icon 215 is actuated, may be classified as auxiliary content 250. Auxiliary content icon 215, when actuated, may present a different color, indicating that an auxiliary content generation feature has been activated.

Document content 240 in document body 230 may be classified as auxiliary content 250, for example, by highlighting or otherwise selecting document content 240 and then actuating the auxiliary content icon 215. Auxiliary content 250 may be reclassified as document content 240, for example, by highlighting or otherwise selecting the content and then actuating the auxiliary content icon 215. Auxiliary content icon 215 may be a button located in word processing template 200, or may be any other user input mechanism that allows the user to classify auxiliary content 250 in word processing template 200. Word processing template 200 may include different mechanisms or may utilize different techniques to generate, classify, and/or differentiate auxiliary content 250 from document content 240.

Word processing template 200 may differentiate between document content 240 and auxiliary content 250 in document body 230. For example, word processing template 200 may outline auxiliary content 250 in document body 230. In some examples, word processing template 200 may differentiate between document content 240 and auxiliary content 250 by formatting auxiliary content 250 differently than document content 240, e.g., by utilizing a different font, font style, font color, font size, background color, indentation, spacing, or the like, or any combination thereof.

Prior to publishing word processing template 200 into a document, both document content 240 and auxiliary content 250 may be visible in document body 230. In some examples, document menu 220 may provide functionality to publish word processing template 200. For example, document menu 220 may include an option to publish word processing template 200 by saving word processing template 200 and by suppressing auxiliary content 250 from the saved document. In some examples, document menu 220 may include an option to save word processing template 200 without suppressing auxiliary content 250 from the saved document. This option may allow a user to save work-in-progress and be able to resume generation of the document with the use of auxiliary content 250 previously included in word processing template 200.

The suppression of auxiliary content 250 may include an automatic removal of auxiliary content 250 from word processing template 200 during publishing. In some examples, auxiliary content 250 may be hidden from document body 230 during publishing. Document menu 220 may include an option to allow users view auxiliary material 250 in the published document, for example, in response to user authentication information, such as a password.

In some examples, auxiliary content 250 may be selectively included into a published document. For example, auxiliary content 250 may be selectively included into a published document in response to receiving user authentication information requesting access to auxiliary content 250. Word processing template 200 also may be populated with content for multiple audiences, and the auxiliary content classification and suppression techniques set forth above may be utilized to selectively include or suppress auxiliary content 250 from the published document based on the audience to receive the published document. A first audience may receive a published document including document content 240, while a second audience may receive a published document including document content 240 and at least a portion of auxiliary content 250, for example, which may provide additional details corresponding to document content 240. For example, in a text book publishing environment, document content 240 may provide an overview of a topic or subject, such as antioxidants, which may be suitable for one grade-level, while additional details regarding that topic or subject may be included in the auxiliary content 250, which may be suitable for a different, e.g., higher, grade level. Thus, users may be able to generate documents for different audiences by selectively suppressing auxiliary content 250 based on the audience to receive the published document.

Figure 3A:
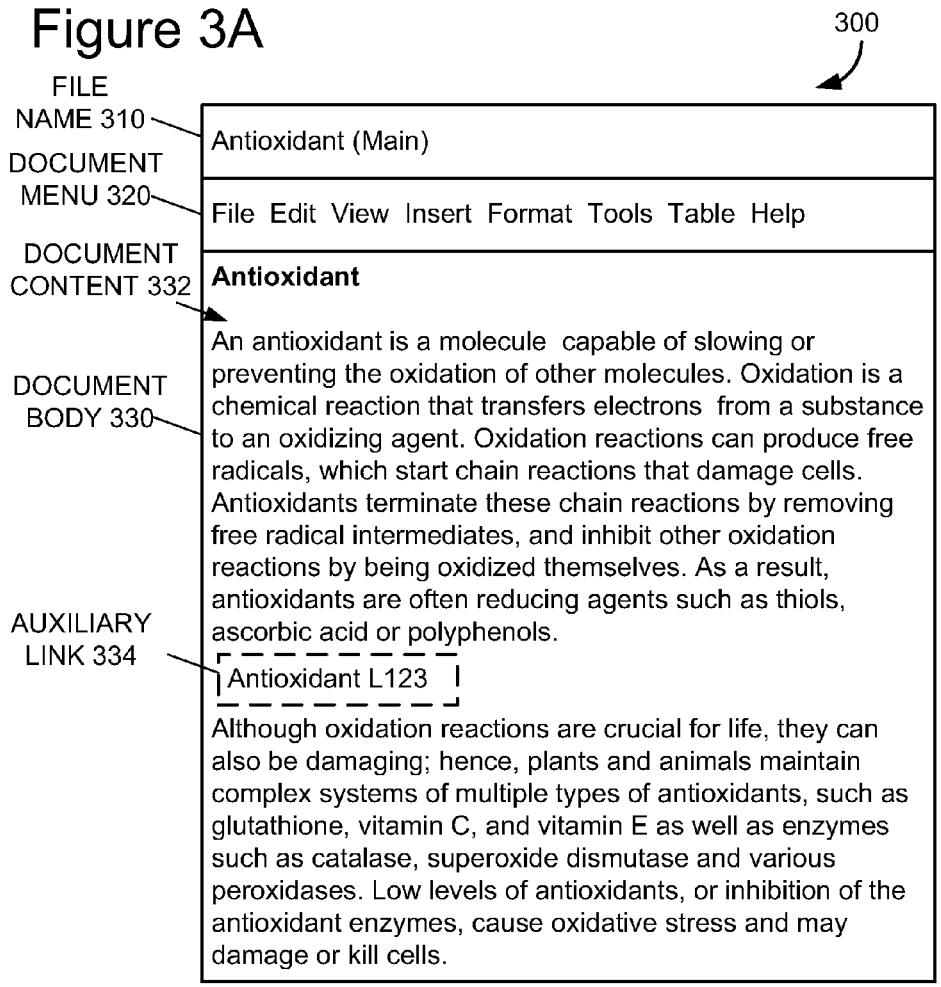
FIGS. 3A-3B depict an example of auxiliary content management with a plurality of word processing files.
Figure 3B:
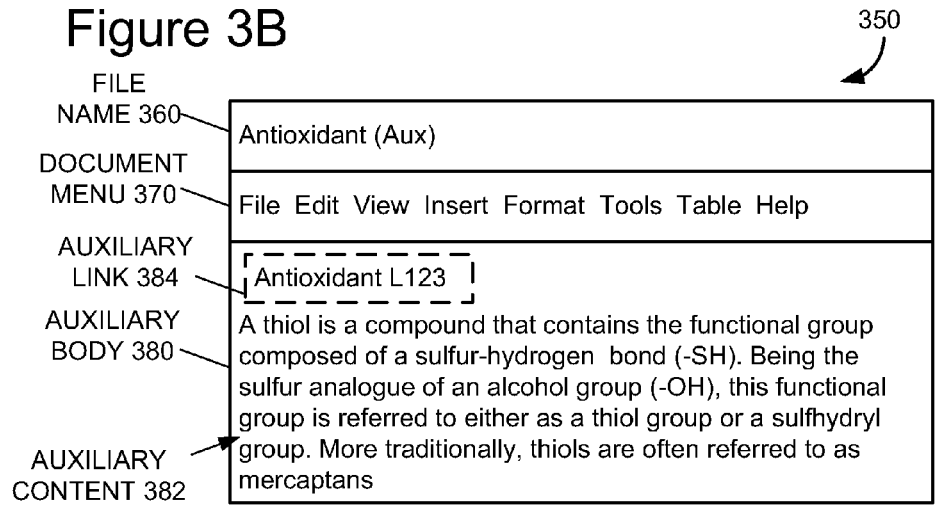

FIGS. 3A-3B depict an example of auxiliary content management with a plurality of word processing files. Referring to FIGS. 3A and 3B, a word processing file 300 may include a file name 310, a document menu 320, and a document body 330. File name 310 may include a name of a document associated with the word processing file 300. Document menu 320 may provide various features for creating, editing, viewing, formatting, and managing content in document body 330.

Document body 330 may include document content 332, such as text, figures, tables, photographs, hyperlinks, multimedia objects, graphical objects, or the like, or any combination thereof. For example, document body 330 may include an article about antioxidants as document content 332. Document body 330 also may include an auxiliary link 334 to a different word processing file, such as an auxiliary word processing file 350, which may include auxiliary content 382, such as notes, reminders, draft text, excerpts from books or other resources, links to various information sources, alternative plots, or the like, or any combination thereof, which may serve as resources for the user to reference while generating document content 332. Auxiliary link 334 may include information associated with where and how to place the auxiliary content 382 in word processing file 300. Word processing template 300 may be published into a document with the auxiliary link 334 hidden from view.

Auxiliary word processing file 350 may include the file name 360, a document menu 370, and an auxiliary body 380. File name 360 may include a name of a document associated with the auxiliary word processing file 350. In some examples, file name 360 may annunciate that auxiliary word processing file 350 includes auxiliary content 382 associated with another file, such as word processing file 300. Document menu 370 may provide various features for creating, editing, viewing, formatting, and managing content in auxiliary body 380.

Auxiliary body 380 may include auxiliary content 382, such as notes, reminders, draft text, excerpts from books or other resources, links to various information sources, alternative plots, or the like, or any combination thereof, which may serve as resources for the user to reference while generating document content 332 in word processing file 300. Auxiliary body 380 also may include an auxiliary link 384 to word processing file 300, and include information corresponding to a location and a format for auxiliary content 382 in document body 330.

When the word processing file 300 is opened, auxiliary link 334 may prompt a determination of whether auxiliary word processing file 350 is accessible. When auxiliary word processing file 350 is accessible, document body 330 of word processing file 300 may be populated with auxiliary content 382 from auxiliary word processing file 350. Thus auxiliary content 382 may be available to word processing file 300 when the auxiliary word processing file 350 is accessible to a processing device that opened word processing file 300. The auxiliary content 382 may be suppressed from the word processing file 300 when the auxiliary word processing file 350 is not accessible to a processing device that opened word processing file 300.

Word processing file 300 may be published by sending the word processing file 300 to a remote device, or optionally by storing word processing file 300, for example, on a memory device. To suppress auxiliary content 382 from a published version of the word processing file 300, a user may elect to not provide auxiliary word processing file 350 with word processing file 300. In some examples, the publishing of the word processing file 300 may remove, hide, or disable auxiliary link 334, which may cause a processing device that opens the word processing file 300 to not locate auxiliary word processing file 350.

Figure 4:
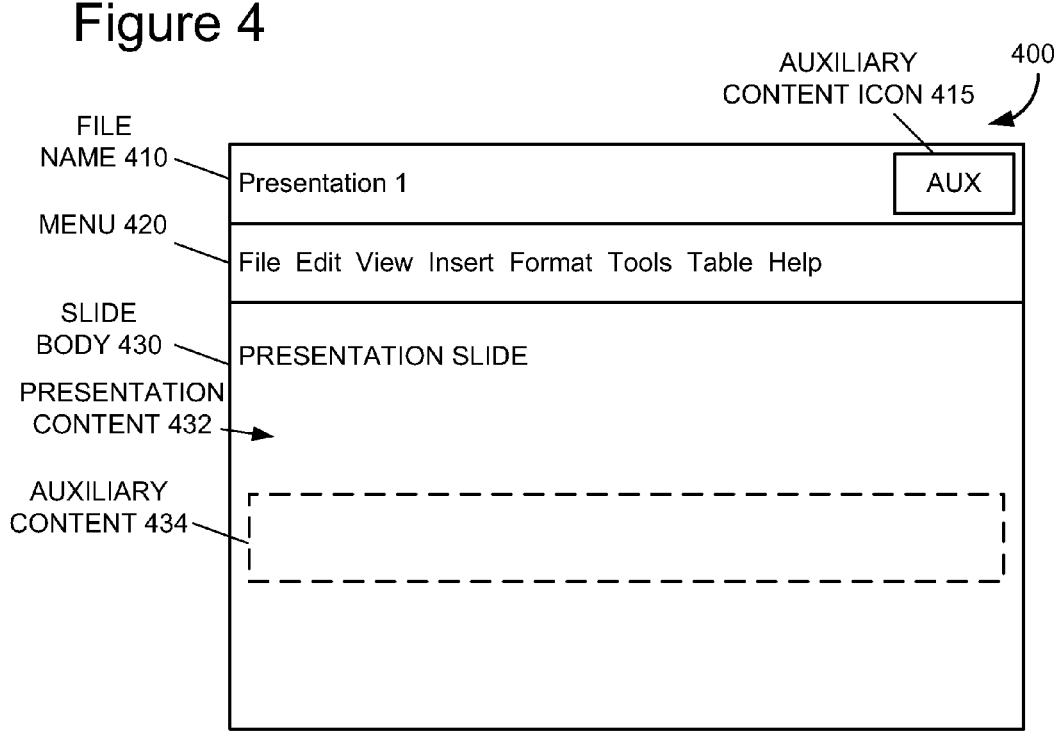
FIG. 4 depicts an example of auxiliary content management with a presentation slide.

FIG. 4 depicts an example of auxiliary content management with a presentation slide 400. Referring to FIG. 4, presentation slide 400 may include a file name, an auxiliary content icon 415, a menu 420, and a slide body 430. File name 410 may include a name of presentation slide 400. Document menu 420 may provide various features for creating, editing, viewing, formatting, and managing content in slide body 430.

Slide body 430 may include slide content 432, such as text, figures, tables, photographs, hyperlinks, multi-media objects, graphical objects, or the like, or any combination thereof. Slide body 430 also may include auxiliary content 434, such as notes, reminders, draft text, excerpts from books or other resources, links to various information sources, alternative plots, or the like, or any combination thereof, which may serve as resources for the user to reference while generating slide content 432.

Presentation slide 400 may differentiate between slide content 432 and auxiliary content 434 in slide body 430. For example, presentation slide 400 may outline auxiliary content 434 in slide body 430. In some examples, presentation slide 400 may differentiate between slide content 432 and auxiliary content 434 by formatting auxiliary content 434 differently than slide content 432, e.g., by utilizing a different font, font style, font color, font size, background color, indentation, spacing, or the like, or any combination thereof.

Presentation slide 400 may classify content in slide body 430 as auxiliary content 434, for example, in response to an actuation of auxiliary content icon 415. In some examples, content entered into slide body 430 while auxiliary content icon 415 is actuated may be classified as auxiliary content 434. Auxiliary content icon 415, when actuated, may present a different color, indicating that an auxiliary content generation feature has been activated. Existing slide content 432 in slide body 430 may be classified as auxiliary content 434, for example, by highlighting or otherwise selecting slide content 432 and then actuating the auxiliary content icon 415. Auxiliary content 434 may be reclassified as slide content 432, for example, by highlighting or otherwise selecting the content and then actuating the auxiliary content icon 415. Auxiliary content icon 415 may be a button located in presentation slide 400, or may be any other user input mechanism that allows the user to classify auxiliary content 434 in presentation slide 400. Presentation slide 400 may include different mechanisms or utilize different techniques to generate, classify, and/or differentiate auxiliary content 434 from slide content 432.

Prior to publishing presentation slide 400, both slide content 432 and auxiliary content 434 may be visible in slide body 430. In some examples, menu 420 may provide functionality to publish presentation slide 400. For example, menu 420 may include an option to publish presentation slide 400 by saving presentation slide 400 and suppressing auxiliary content 434 from the saved presentation slide 400. In some examples, the menu 420 may include an option to save presentation slide 400 without suppressing auxiliary content 434 from the saved document. This option may allow a user to save work-in-progress and be able to resume generation of the presentation slide 400 with the use of auxiliary content 434 previously included in presentation slide 400.

The suppression of auxiliary content 434 may include a removal of auxiliary content 434 from presentation slide 400 during publishing. In some examples, auxiliary content 434 may be hidden from slide body 430 during publishing. Menu 420 may include an option to allow users view auxiliary material 434 in the published presentation slide 400, for example, in response to user authentication information, such as a password.

Figure 5:
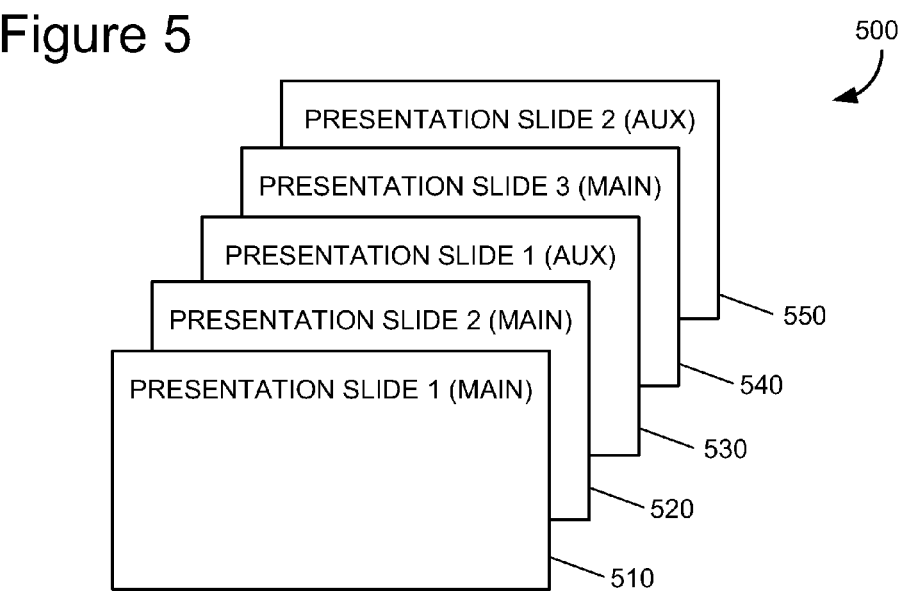
FIG. 5 depicts an example of auxiliary content management with a plurality of presentation slides.

FIG. 5 depicts an example of auxiliary content management with multiple presentation slides. Referring to FIG. 5, a slide presentation file 500 may include main slides, such as presentation slides 510, 520, and 540, and auxiliary slides, such as presentation slides 530 and 550. In some examples, the main slides may be those slides that include content to be presented during a slide presentation, while the auxiliary slides may be reference slides for use to generate content for the main slides or may be back-up slides for selective use during the slide presentation.

The auxiliary slides may be removed from or hidden in slide presentation file 500 when slide presentation file 500 is published or presented. During a presentation, hidden auxiliary slides may be accessed, for example, in response to user authentication information, such as a password, and optionally, presented along with the main slides.

In some examples, presentation slides 510, 520, and 540, which include presentation content, also may include auxiliary content. The auxiliary content may be utilized as reference material for the generation of content for the presentation slides 510, 520, and 540. This auxiliary content may be removed from presentation slides 510, 520, and 540 during publication or presentation.

Figure 6A:
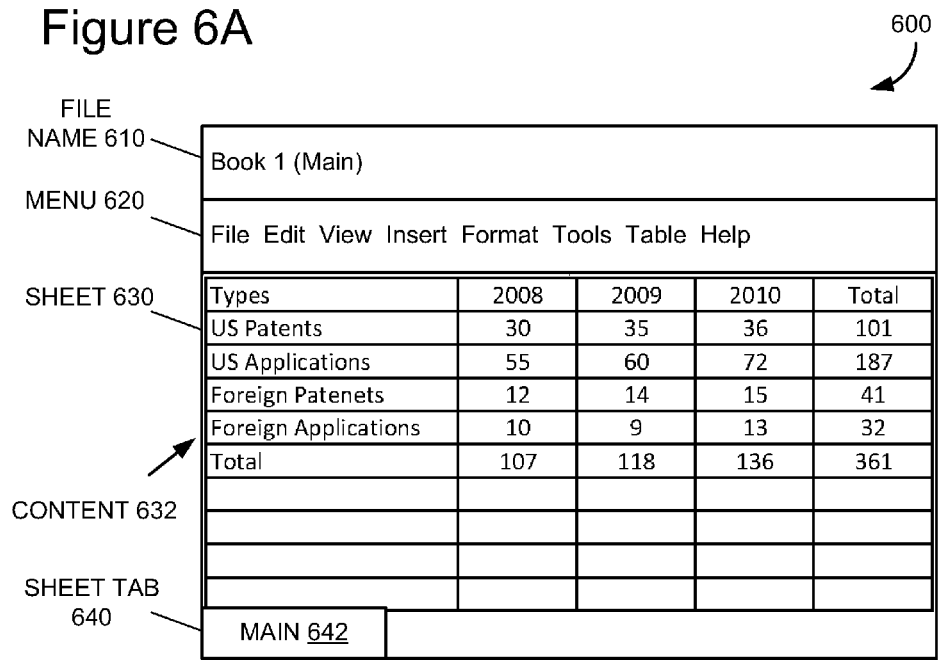

FIGS. 6A-6B depict an example of auxiliary content management with multiple worksheets. Referring to FIGS. 6A and 6B, a worksheet 600 may include the file name 610, a menu 620, a sheet 630, and a sheet tab 640. File name 610 may include a name of worksheet 600. Menu 620 may provide various features for creating, editing, viewing, formatting, and managing content in sheet 630. Sheet tab 640 may be a selectable button that, when activated, may present sheet 630. In some examples, sheet tab 640 may include an identifier of sheet 630, such as main 642.

Sheet 630 may include multiple cells that may be populated with content 632, such as text, figures, tables, photographs, hyperlinks, multi-media objects, graphical objects, or the like, or any combination thereof. At least some of the cells in sheet 630 may have a link to a different worksheet, such as an auxiliary worksheet 650, which may include auxiliary content 682 associated with the content in the corresponding cell. The auxiliary content 682 may include further detail regarding the content in the cell, or include additional reference information, such as notes, reminders, draft text, excerpts from books or other resources, links to various information sources, alternative entries, or the like, or any combination thereof, which may serve as resources for the user to reference. Worksheet 600 may be published with the links in the cells removed or hidden from view.

Auxiliary worksheet 650 may include the file name 660, a menu 670, an auxiliary sheet 680, and a sheet tab 690. File name 660 may include a name of worksheet 650. In some examples, file name 660 may annunciate that auxiliary worksheet 650 includes auxiliary content 682 associated with another file, such as worksheet 600. Menu 670 may provide various features for creating, editing, viewing, formatting, and managing content in auxiliary sheet 680. Sheet tab 690 may be a selectable button that, when activated, may present auxiliary sheet 680. In some examples, sheet tab 690 may include an identifier of auxiliary sheet 680, such as aux 692.

Worksheet 600 may be published by sending worksheet 600 to a remote device, or optionally by storing worksheet 600, for example, on a memory device. To suppress auxiliary content 382 from a published version of the worksheet 600, a user may elect to not provide auxiliary worksheet 650 with worksheet 600. The publishing of the worksheet may remove, hide, or disable the links from the cells in the sheet 630. In some examples, worksheet 600 and auxiliary worksheet 650 may be included in a common file, for example, and sheet tab 640 and sheet tab 690 may be utilized to select between the worksheet 600 and auxiliary worksheet 650, respectively.

FIG. 7 depicts a flow chart of an example process 700 for managing auxiliary content in a document template. Referring to FIG. 7, at operation 710, a document template may be displayed. The document template may be a word processing page, a worksheet, a presentation slide, or the like, or any combination thereof. In some examples, a document generation application, such as a word processing application, a worksheet application, or a slide presentation application, may prompt the display of the document template, for example, in response to execute by processing device 110.

At operation 720, electronic content may be received. In some examples, the electronic content may be received in response to the display of the document template. The electronic content may be received in various formats, such as a textual input, a graphical input, an audio input, a selection input corresponding to the document template, or the like, or any combination thereof.

At operation 730, at least some of the electronic content may be classified as auxiliary content. The classification of the electronic content as auxiliary content may be performed in response to a user selection of the electronic content. For example, electronic content received following the user selection may be classified as auxiliary content.

At operation 740, the document template may be populated with main content and auxiliary content. The main content may include text, figures, table, photographs, hyperlinks, multi-media, graphical objects, or the like, or any combination thereof. The auxiliary content may include notes, reminders, draft text, excerpts from books or other resources, links to various information sources, alternative plots, or the like, or any combination thereof, which may serve as resources for the user to reference while generating the document content. In some examples, the auxiliary content may include additional document content, which may be selectively included in a published document as main content. Although FIG. 7 depicts the population of the document template with electronic content after at least some of the electronic content is classified as auxiliary content, in some examples, the electronic content may be classified as auxiliary content after the electronic content is populated into the document template. For example, electronic content populated into document template may be selected to be classified as auxiliary content, such as by highlighting the electronic content and selecting an auxiliary content icon.

Multiple document templates may be utilized to incorporate both the main content and the auxiliary content. In some examples, one of the document templates may include main content and a link to the auxiliary content located in a different document template. The link may allow access to the auxiliary content, for example, by automatically incorporating the auxiliary content with the main content. In some examples, the link may prompt a display of the different document template and the auxiliary content.

At operation 750, a document may be published with main content from the document template. The document may be published in a variety of ways, including saving the document to a memory device or by sending the document to a remote device, such as a third party for review or presentation.

At operation 760, auxiliary content may be suppressed from the published document. In some examples, the auxiliary content may be suppressed from the published document before, during, or after the publishing of the document, and performed automatically based on the classification of the electronic content as auxiliary content. Suppression of the auxiliary content from the published document may include removing the auxiliary content from the published document. In some examples, suppression of the auxiliary content from the published document may include hiding the auxiliary content in the published document.

In some examples, the suppression of the auxiliary content may be selective based on the audience to receive the published document, e.g., the auxiliary content may be selectively included in the published document, not suppressed, at the time of publishing. For example, when the document template has multiple different audiences, content that all audiences receive may be the main content. Other content, which at least one audience is excluded from receiving, may be auxiliary content. This auxiliary content may be selectively included into published documents based on the audience that is to receive the published documents.

At operation 770, access may be selectively granted to the auxiliary content suppressed in the published document. In some examples, the hidden auxiliary content may be secured, for example, password protected, and may be accessed in response to user authentication. When the auxiliary content is located in a different document template, the selective granting of access may be effectuated when a device presenting the published document has access to the different document template.

The systems and apparatus described above can use dedicated processor systems, micro controllers, programmable logic devices, or microprocessors that perform some or all of the operations. Some of the operations described above may be implemented in software and other operations may be implemented in hardware. One or more of the operations, processes, or methods described herein may be performed by an apparatus, device, or system similar to those as described herein and with reference to FIGS. 1-7.

The processing device can execute instructions or "code" stored in memory. The memory may store data as well. The processing device may include, but is not limited to, an analog processor, a digital processor, a microprocessor, multi-core processor, processor array, network processor, etc. The processing device may be part of an integrated control system or system manager, or provided as a portable electronic device capable of interfacing with a networked system either locally or remotely via wireless transmission.

The processor memory may be integrated together with the processing device, for example RAM or FLASH memory disposed within an integrated circuit microprocessor or the like, or any combination thereof. In other examples, the memory comprises an independent device, such as an external disk drive, storage array, or portable FLASH key fob. The memory and processing device may be operatively coupled together, or in communication with each other, for example by an I/O port, network connection, etc. such that the processing device can read a file stored on the memory. Associated memory may be "read only" by design (ROM) by virtue of permission settings, or not. Other examples of memory include, but are not limited to, WORM, EPROM, EEPROM, FLASH, etc. which may be implemented in solid state semiconductor devices. Other memories may comprise moving parts, such a conventional rotating disk drive. All such memories are "machine-readable" in that they are readable by a processing device.

Operating instructions or commands may be implemented or embodied in tangible forms of stored computer software (also known as a "computer program" or "code"). Programs, or code, may be stored in a digital memory that can be read by the processing device. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate processing device. By the term "computer-readable" we do not intend to limit the phrase to the historical usage of "computer" to imply a complete mainframe, mini-computer, desktop or even laptop computer. Rather, we use the term to mean that the storage medium is readable by a processor, processing device, or any computing system. Such media may be any available media that is locally and/or remotely accessible by a computer or processor, and it includes both volatile and non-volatile media, removable and non-removable media.

Where a program has been stored in a computer-readable storage medium, we may refer to that storage medium as a computer program product. For example, a storage medium may be used as a convenient means to store or transport a computer program.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
prompting, by a processing device, a display of a document template available for population with electronic content;

populating, by the processing device, the document template with first content and second content after the display of the document template to generate a document body, wherein both the first content and the second content are located within the document body, wherein the first content comprises content classified as main content, and wherein the second content comprises additional content classified as auxiliary content;

receiving a user-selection indicating a first subset of the auxiliary content;

reclassifying the first subset of the auxiliary content located within the document body as the main content based, at least in part, on the user-selection, wherein a second subset of the auxiliary content located within the document body that is not selected remains classified as the auxiliary content after reclassifying the first subset;

receiving, by the processing device, a request to suppress the auxiliary content located within the document body from being published;

receiving, by the processing device, user authentication information;

publishing, by the processing device, a document from the document template, wherein the publishing of the document causes both the content classified as the main content and the first subset of the auxiliary content reclassified as the main content to be displayed in the published document, wherein the publishing of the document further causes the second subset of the auxiliary content, located within the document body, to be suppressed from being displayed in the published document based, at least in part, on receipt of the request to suppress, wherein at least a portion of the second subset is hidden in the published document, and wherein the published document includes the first content and at least a portion of the second content from the document template; and granting, by the processing device, access to the second subset hidden in the published document based on the user authentication information.

2. The method of claim 1, further comprising reclassifying a portion of the main content located within the document body as the auxiliary content, wherein the auxiliary content suppressed from display in the published document includes the portion of the main content reclassified as the auxiliary content.

3. The method of claim 1, wherein the publishing of the document causes at least a portion of the second content located within the document body to be removed from the published document.

4. The method of claim 1, wherein the user authentication information includes a password.

5. The method of claim 1, further comprising:
displaying, by the processing device, the document template; and
receiving, by the processing device, electronic content including the first content and the second content after the displaying of the document template.

6. The method of claim 5, further comprising:
displaying, by the processing device, an auxiliary content icon with the document template; and
classifying, by the processing device, at least a portion of the electronic content as the auxiliary content based on user input associated with the auxiliary content icon.

7. The method of claim 1, wherein the second content includes reference material located within the document body.

8. The method of claim 1, wherein the second content includes additional first content available for selective inclusion in the published document.

9. The method of claim 1, further comprising:
defining, by the processing device, an audience to receive the published document; and
publishing, by the processing device, the document with the first subset of the auxiliary content reclassified as the main content based on the audience to receive the published document.

10. The method of claim 1, wherein publishing the document includes transmitting the document to a remote device.

11. The method of claim 1, wherein publishing the document includes saving the document to a memory device.

12. The method of claim 1, wherein the user-selection indicating the first subset corresponds to a highlighted section of the auxiliary content.

13. An apparatus comprising: a computing device configured to:
prompt a display of a document available for population with electronic content;
introduce electronic content into a body of the document after the display of the document;
classify at least a first portion of the electronic content located within the body of the document as document content;
classify at least a second portion of the electronic content separate from the first portion as reference material, wherein both the document content and the reference material are located within the body of the document;
reclassify a first subset of the reference material located within the body of the document as the document content based, at least in part, on receiving a user-selection indicative of the first subset, wherein a second subset of the reference material separate from the first subset remains classified as the reference material after reclassifying the first subset;
receive user authentication information;
publish the document, wherein the computing device is configured to display the document content comprising both the first portion and the reclassified first subset in the published document, wherein the computing device is further configured to suppress the reference material, including the second subset located within the body of the document, from being displayed in the published document, wherein at least a portion of the second subset is hidden in the published document, and wherein the published document includes the first portion of the electronic content and at least a portion of the second portion of the electronic content from the body of the document; and
grant access to the second subset hidden in the published document based on the user authentication information.

14. The apparatus of claim 13, wherein the computing device is configured to remove the reference material from the published document.

15. The apparatus of claim 13, wherein the user authentication information includes a password.

16. The apparatus of claim 13, wherein the computing device is configured to populate the document with the document content and the reference material, and suppress the populated reference material from the published document.

17. The apparatus of claim 13, further comprising a display device configured to present the document content and the reference material in a document template.

18. The apparatus of claim 17, wherein the computing device is configured to prompt the display device to differentiate the reference material from the document content in the document template.

19. The apparatus of claim 17, wherein the display device is configured to display a reference material icon with the document template, and wherein the computing device is configured to classify the reference material based on user input associated with the reference material icon.

20. The apparatus of claim 13, wherein the computing device is configured to classify at least a portion of the electronic content as supplemental document content, and publish the document to selectively include the supplemental document content based on the classification.

21. The apparatus of claim 20, wherein the computing device is configured to define an audience to receive the published document, and publish the document with the supplemental document content based on the audience to receive the published document.

22. The apparatus of claim 13, wherein the computing device is further configured to receive a request to suppress the second portion of the electronic content from view in the published document, and wherein the second portion of the electronic content is classified as the reference material based, at least in part, on receipt of the request to suppress.

23. The apparatus of claim 13, wherein the computing device is configured to receive the user-selection, and wherein the user-selection indicates a section of the reference material highlighted by the user.

24. An apparatus including a computer-readable memory device having instructions stored thereon that, in response to execution by a processing device, cause the processing device to perform operations comprising:
prompting a display of a document available for population with electronic content;
introducing the electronic content into a body of the document after the display of the document;
identifying a first portion of the electronic content included within the body of the document to generate a published version of the document;
identifying a second portion of the electronic content to suppress from the published version of the document, wherein both the first portion of the electronic content and the second portion of the electronic content are located within the body of the document;
reclassifying a first subset of the second portion as the first portion based, at least in part, on receipt of a user-selection indicative of the first subset, wherein a second subset of the second portion separate from the first subset remains classified as the second portion after reclassifying the first subset;
receiving user authentication information;
publishing the document based, at least in part, on the identification of the first portion and the second portion of the electronic content, wherein the second portion of the electronic content, including the second subset located within the body of the document, is suppressed from being displayed in the published version of the document, wherein at least a portion of the second subset is hidden in the published version of the document, wherein the published version of the document includes the first portion of the electronic content and at least a portion of the second portion of the electronic content from the body of the document, and wherein the reclassified first subset is displayed in the published version of the document; and granting access to the second subset hidden in the published version of the document based on the user authentication information.

25. The apparatus of claim 24, wherein the operations further comprise removing the second portion of the electronic content from the published version of the document.

26. The apparatus of claim 24, wherein the user authentication information includes a password.

27. The apparatus of claim 24, wherein the operations further comprise populating the document with the electronic content.

28. The apparatus of claim 24, wherein the second portion of the electronic content includes reference material included in the display of the document.

29. The apparatus of claim 24, wherein the operations further comprise identifying a third portion of the electronic content available for selective inclusion in the published version of the document.

30. The apparatus of claim 29, wherein the operations further comprise:
  defining an audience to receive the published version of the document; and
  publishing the document to include the third portion of the electronic content based on the audience to receive the published version of the document.

31. The apparatus of claim 24, wherein the operations further comprise displaying a document template including a body section configured to be populated with the electronic content, and a control section configured to format the body section of the document template.

32. The apparatus of claim 31, wherein the control section of the document template includes an icon that, when activated, is configured to identify the second portion of the electronic content in the body section of the document template.

33. The apparatus of claim 32, wherein the operations further comprise displaying the second portion of the electronic content in the body section differently than the first portion of the electronic content in the body section in response to the activation of the icon.

34. The apparatus of claim 24, wherein the operations further comprise receiving user input, and wherein the received user input comprises the user-selection indicative of the first subset.

35. A system comprising:
  a display device configured to present a document template configured to include electronic content;
  means for populating a document body of the document template with the electronic content after the display device presents the document template, wherein the display device is configured to present the electronic content populated in the document body;
  means for classifying a first portion of the electronic content located within the document body as document content and for classifying a second at least a portion of the electronic content located within the document body as auxiliary content;
  means for reclassifying a first subset of the auxiliary content as the document content based, at least in part, on receipt of a user-selection indicative of the first subset, wherein a second subset of the auxiliary content separate from the first subset remains classified as the auxiliary content after reclassifying the first subset;
  means for receiving user authentication information;
  means for publishing a document based on the document template, wherein the means for publishing is configured to:
  suppress the auxiliary content, including the second subset located within the document body, from being displayed in the published document based, at least in part, on the classification, wherein at least a portion of the second subset is hidden in the published document; and
  display the document content, including the first subset located within the document body and reclassified as the document content, in the published document, wherein the published document includes the first portion of the electronic content and at least a portion of the second portion of the electronic content from the document body; and
  means for granting access to the second subset hidden in the published document based on the user authentication information.

36. The system of claim 35, wherein the means for publishing is configured to remove the auxiliary content from the published document.

37. The system of claim 35, wherein the auxiliary content includes reference material viewable in the document template.

38. The system of claim 35, wherein the auxiliary content includes supplemental content available for selective inclusion in the published document.

39. The system of claim 38, further comprising means for defining an audience to receive the published document, wherein the means for publishing is configured to include the supplemental content in the published document based on the audience to receive the published document.

40. The system of claim 35, wherein the means for publishing is configured to transmit the document to a remote device.

41. The system of claim 35, wherein the means for publishing is configured to store the document to a memory device.

42. The system of claim 35, wherein the means for classifying comprises means for receiving a request to suppress the portion of the electronic content from view in the published document, and wherein the portion of the electronic content is classified as the auxiliary content based, at least in part, on receipt of the request to suppress.

* * * * *